United States Patent
Matthews (10) Patent No.: US 8,700,263 B2
(45) Date of Patent: Apr. 15, 2014

(54) METHODS AND SYSTEM FOR AUTOMATIC USER-CONFIGURABLE STEERING PARAMETER CONTROL

(75) Inventor: Paul Matthews, Bel Aire, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/544,768

(22) Filed: Jul. 9, 2012

(65) Prior Publication Data

US 2013/0103260 A1    Apr. 25, 2013

Related U.S. Application Data (62) Division of application No. 12/140,421, filed on Jun. 17, 2008, now Pat. No. 8,244,434.

(51) Int. Cl.
| | |
|---|---|
| *B62D 5/04* | (2006.01) |
| *A01B 69/00* | (2006.01) |
| *B62D 6/00* | (2006.01) |

(52) U.S. Cl.
CPC .............. *A01B 69/007* (2013.01); *B62D 6/002* (2013.01)
USPC .......................................................... 701/42

(58) Field of Classification Search
USPC ............................................... 701/41, 42, 44
See application file for complete search history.

(56) References Cited

U.S. PATENT DOCUMENTS

| | | | | |
|---|---|---|---|---|
| 6,278,922 | B1 * | 8/2001 | Nishiwaki ...................... | 701/41 |
| 6,493,619 | B2 * | 12/2002 | Kawazoe et al. ............... | 701/41 |
| 6,705,424 | B2 * | 3/2004 | Ogawa et al. .................. | 180/446 |
| 6,918,460 | B2 * | 7/2005 | Tajima et al. .................. | 180/402 |
| 7,567,863 | B2 * | 7/2009 | Suzumura et al. ............. | 701/42 |
| 7,613,556 | B2 * | 11/2009 | Arima et al. ................... | 701/41 |
| 7,835,837 | B2 * | 11/2010 | Suzumura et al. ............. | 701/41 |
| 7,865,283 | B2 * | 1/2011 | Ishihara et al. ................ | 701/41 |

* cited by examiner

*Primary Examiner* — Kevin Hurley
(74) *Attorney, Agent, or Firm* — Hovey Williams LLP

(57) ABSTRACT

A vehicle guidance system and method for automatically adjusting an amount of a user-configurable steering parameter applied to at least one steerable wheel of a vehicle. The vehicle guidance system may comprise a computing device for receiving a desired angle of the steerable wheel, measuring the actual angle of the steerable wheel, and comparing the actual angle with the desired angle. The computing device may then decrease the user-configurable steering parameter automatically if over-steering has occurred, meaning the actual angle of the wheel is determined to be greater than the desired angle of the wheel and angled in the same direction as the desired angle, or the computing device may increase the user-configurable steering parameter automatically if under-steering has occurred, meaning the actual angle of the wheel is determined to be less than the desired angle of the wheel or is angled in the opposite direction as the desired angle.

1 Claim, 6 Drawing Sheets

METHODS AND SYSTEM FOR AUTOMATIC USER-CONFIGURABLE STEERING PARAMETER CONTROL

RELATED APPLICATION

This divisional application claims priority to U.S. application Ser. No. 12/140,421, filed Jun. 17, 2008, now U.S. Pat. No. 8,244,434, entitled METHODS AND SYSTEM FOR AUTOMATIC USER-CONFIGURABLE STEERING PARAMETER CONTROL, which is hereby incorporated in its entirety by reference herein.

BACKGROUND

1. Field

Embodiments of the present invention relate to methods and systems for automatically adjusting a user-configurable steering parameter of vehicle guidance systems. More particularly, the invention relates to methods and systems for determining if under-steering or over-steering is occurring during operation of a vehicle and automatically adjusting the user-configurable steering parameter accordingly.

2. Related Art

Vehicle guidance systems use control algorithms to direct vehicles from location to location. Each vehicle's architecture, such as front wheel steering, rear wheel steering, etc., can affect the steering performance of the vehicle. Furthermore, ground conditions or the addition of an implement, such as a trailer hitched to a vehicle, may also contribute to a vehicle's steering performance. These and other variable factors can affect the guidance system's ability to get the vehicle to the desired path (i.e. the path defined by the guidance system) in a timely, comfortable, and optimal manner.

Some guidance systems allow an operator to vary different parameters of the control algorithms to maintain equivalent steering performance independent of the vehicle architecture. Specifically, operators of some vehicle guidance systems may adjust a user-configurable steering parameter such as steering gain or sensitivity to accommodate for varying vehicle architectures, attachments, and ground conditions. However, if the parameters for the control algorithms or the user-configurable steering parameters are not set correctly, optimal steering performance may not be achieved. Additionally, if ground or vehicle conditions change during operation, such as moving from soil to clay or having liquid tanks empty throughout a field, the vehicle may also move further away from optimal performance.

Selecting a user-configurable steering parameter value that is too high can make the steering system too aggressive and causes what is referred to as over-steering. Selecting a user-configurable steering parameter value that is too low can make the steering system response too sluggish and causes what is referred to as under-steering. Though the operator may have access to adjust the user-configurable steering parameter, such as the steering gain, during operation of the vehicle, there is a point at which the operator can't distinguish the change in performance, even though there is some degradation.

Accordingly there is a need for a method for dynamically and accurately adjusting the steering gain of a vehicle guidance system during operation the does not suffer from the problems and limitations of the prior art.

SUMMARY

Various embodiments of the invention provide a vehicle guidance system and method for automatically adjusting an amount of a user-configurable steering parameter, such as steering gain or sensitivity, applied to at least one steerable wheel of a vehicle in order to optimize the steering performance of the vehicle. The vehicle guidance system may comprise a location determining component, a computing device, memory, and an angle measurement device.

The location determining component may be a GPS receiver that determines position data based on received satellite signals. The computing device may have algorithms which use inputs from a user and/or the location determining component to form command signals for the desired rotational speed and desired turn angle of the wheels of the vehicle. The desired angle may be sent to a compensation module of the computing device. Additionally, the angle measurement device may measure the actual angle of the wheel for a given point in time and send this value to the compensation module as well.

The compensation module may compare the actual angle of the wheel with the desired angle of the wheel to determine if the actual angle is equal to or within an acceptable range of deviation from the desired angle. The compensation module may then decrease the user-configurable steering parameter automatically if over-steering has occurred, wherein the actual angle of the wheel is greater than the desired angle of the wheel and angled in the same direction as the desired angle. Conversely, the compensation module may increase the user-configurable steering parameter automatically if under-steering has occurred, wherein the actual angle of the wheel is less than the desired angle of the wheel or is angled in the opposite direction as the desired angle.

In preferred embodiments of the invention, the computing device may record a history of incidents of under-steering and over-steering, and adjust the user-configurable steering parameter automatically when a pre-determined limit of incidents are recorded during a pre-determined period of time. Furthermore, the computing device may calculate the average deviation of the actual wheel angles from the desired wheel angles of the recorded incidents over the pre-determined period of time and adjust the user-configurable steering parameter based on the average deviation.

In other various embodiments of the invention, the computing device may separately count incidents of over-steering and incidents of under-steering, so that the user-configurable steering parameter may be automatically adjusted when a predetermined limit of over-steering incidents or under-steering incidents are recorded during a pre-determined period of time. Furthermore, the computing device may calculate the average deviation of the actual wheel angles from the desired wheel angles of the recorded over-steering or under-steering incidents over the pre-determined period of time and may adjust the user-configurable steering parameter based on this average and whether the limit for occurrences of over-steering or under-steering has been reached.

In other various embodiments of the invention, the computing device may have a manual mode in which the user may control the user-configurable steering parameter adjustments manually during operation of the vehicle.

These and other important aspects of the present invention are described more fully in the detailed description below.

BRIEF DESCRIPTION OF THE DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawing figures that illustrate specific embodiments in which the present invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense.

Figure 1:
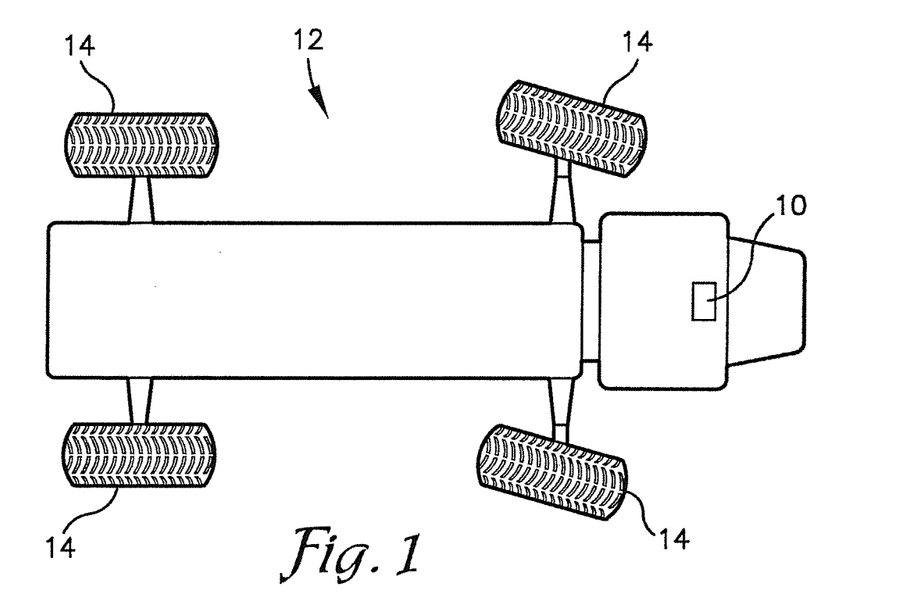
FIG. 1 is a schematic plan view of a vehicle having a vehicle guidance system and a plurality of wheels according to an embodiment of the invention.
Figure 2:
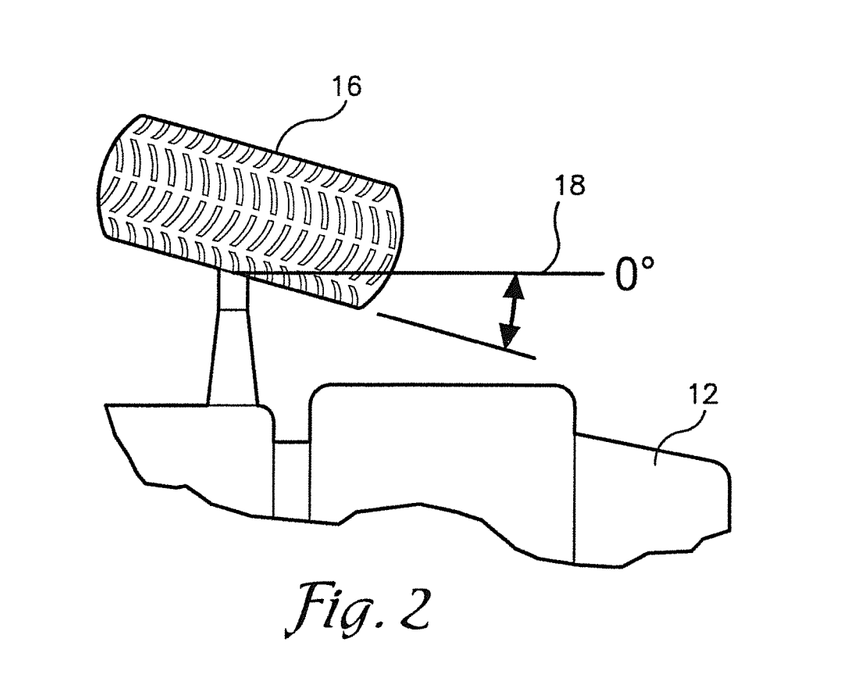
FIG. 2 is a fragmentary plan view of the vehicle of FIG. 1 and one of its wheels, wherein the wheel is steerable.

Embodiments of the present invention provide a vehicle guidance system 10 preferably incorporated as part of a land-based vehicle 12. As illustrated in FIGS. 1-2, the land-based vehicle 12 may be an agricultural vehicle, automobile, all-terrain vehicle, or any other type of land-based vehicle known in the art. The vehicle may include a plurality of wheels 14, with at least one steerable wheel 16 operable to turn, pivot, and/or rotate about a center axis 18 such that the vehicle 12 may be steered in the direction in which the wheel 16 turns, pivots, or rotates.

Figure 3:
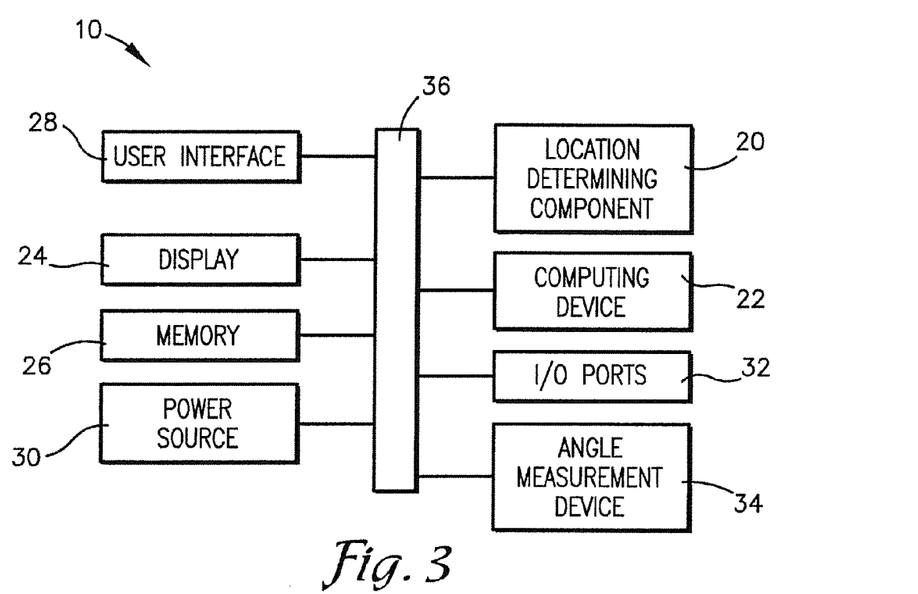
FIG. 3 is a block diagram illustrating certain components of the vehicle guidance system of FIG. 1.

The vehicle guidance system 10 can be implemented in hardware, software, firmware, or a combination thereof. An exemplary embodiment of the vehicle guidance system 10 may comprise a location-determining component 20, at least one computing device 22, a display 24, memory 26, a user interface 28, a power source 30, one or more I/O ports 32, and an angle measurement device 34, as illustrated in FIG. 3. The guidance system 10 is operable to adjust a user-configurable steering parameter, such as steering gain, steering sensitivity, steering force, etc., of the vehicle 12 automatically during operation of the vehicle 12 by calculating the required user-configurable steering parameter or the required adjustment of the user-configurable steering parameter based on an actual angle of the steerable wheel 16 at various points in time as measured by the angle measurement device 34, illustrated in FIG. 3.

The location-determining component 20, which may be mounted to the vehicle 12, determines positions of the vehicle guidance system 10 as it is moved from place to place and generates and sends corresponding position data to the computing device 22. In one embodiment, the location-determining component 20 may be a satellite navigation receiver that works with a global navigation satellite system (GNSS) such as the global positioning system (GPS) primarily used in the United States, the GLONASS system primarily used in the Soviet Union, or the Galileo system primarily used in Europe.

Figure 4:
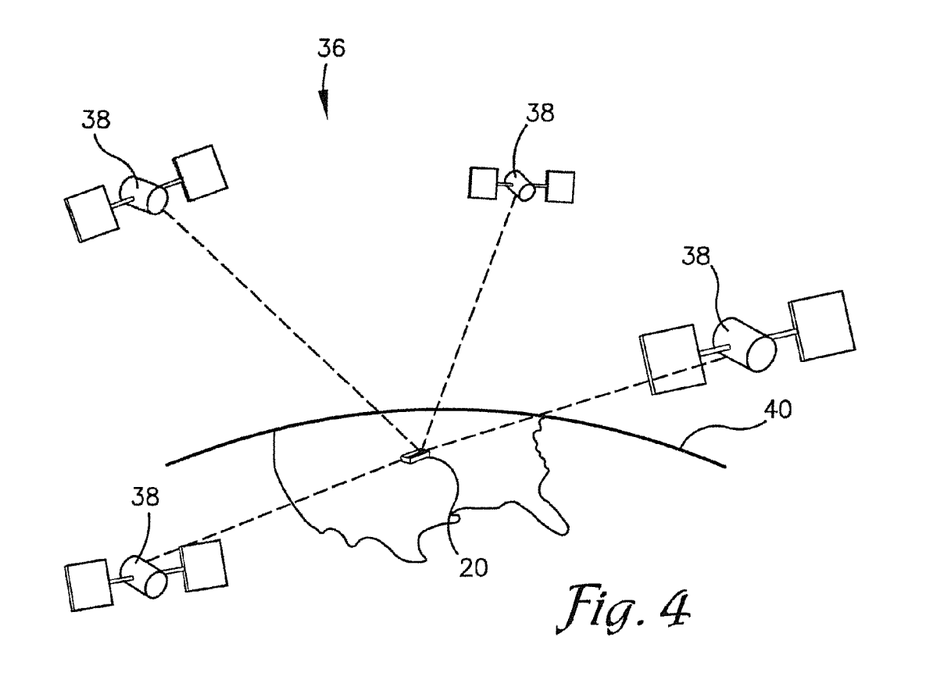
FIG. 4 is a schematic diagram of a Global Positioning System (GPS) that may be used to send GPS signals to the vehicle guidance system of FIG. 1.

For example, FIG. 4 shows a representative view of a GPS denoted generally by reference numeral 36. A plurality of satellites 38 are in orbit about the Earth 40. The orbit of each satellite is not necessarily synchronous with the orbits of other satellites and, in fact is likely asynchronous. The location-determining component 20 is shown as a GPS receiver, receiving spread spectrum GPS satellite signals from the various satellites 38.

The spread spectrum signals continuously transmitted from each satellite 38 utilize a highly accurate frequency standard accomplished with an extremely accurate atomic clock. Each satellite 38, as part of its data signal transmission, transmits a data stream indicative of that particular satellite. As a GPS receiver, the location-determining component 20 must acquire spread spectrum GPS satellite signals from at least three satellites for the location-determining component 20 to calculate its two-dimensional position by triangulation. Acquisition of an additional signal, resulting in signals from a total of four satellites, permits the location-determining component 20 to calculate its three-dimensional position.

The location-determining component 20 may include an antenna to assist in receiving the satellite signals. The antenna may be a any type of antenna that can be used with navigational devices to receive satellite signals. The location-determining component 20 is operable to receive navigational signals from the GPS satellites 38 and to calculate positions of the location-determining component 20 as a function of the signals. The location determining component 20 may send these calculated positions to the computing device 22 to determine track logs or any other series of geographic coordinates corresponding to points along a path traveled by the vehicle 12. The computing device 22 is also operable to calculate routes to desired positions, provide instructions to navigate to the desired positions, display maps and other information on the display screen 24, and execute other functions as described herein.

Although one embodiment of the vehicle guidance system 10 describes the location-determining component 20 as a GPS receiver, it is noted that equivalents may be employed and substitutions made without departing from the scope of the invention as recited in the claims. For example, in other embodiments of the invention, the location determining component 20 need not directly determine its current geographic position. For instance, the location determining component 20 may determine the current geographic position by receiving position information directly from the user, through a communications network, or from another electronic device.

The location determining component 20 may include one or more processors, controllers, or other computing devices and memory so that it may calculate position and other geographic information without the computing device 22. Further, the location determining component 20 may be integral with the computing device 22 such that the location determining component 20 may be operable to specifically perform the various functions described herein. Thus, the computing device 20 and location determining component 20 can be combined or be separate or otherwise discrete elements.

The display 24 is coupled with the computing device 16 and is operable to display various information corresponding to the vehicle 12 and its guidance system 10, such as maps, positions, and directions as described below. The display 24 may comprise conventional black and white, monochrome, or color display elements including CRT, TFT, LCD, and/or plasma display devices. Preferably, the display 24 is of sufficient size to enable a user to easily view it while driving the vehicle 12.

The display 24 may be integrated with the user interface 28, such as in embodiments where the display 24 is a touch-screen display to enable the user to interact with it by touching or pointing at display areas to provide information to the guidance system 10.

The computing device 22 may include any number of processors, controllers, integrated circuits, programmable logic devices, or other computing devices and resident or external memory for storing data and other information accessed and/or generated by the vehicle guidance system 10. The computing device 22 is preferably coupled with the location-determining component 20, the display 24, the memory 26, the user interface 28, and other components through wired or wireless connections, such as a data bus 36, to enable information to be exchanged between the various components.

The computing device 22 may implement a computer program and/or code segments to perform the functions described herein. The computer program preferably comprises an ordered listing of executable instructions for implementing logical functions in the computing device 22. The computer program can be embodied in any computer-readable medium for use by or in connection with an instruction execution system, apparatus, or device, and execute the instructions. In the context of this application, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, device or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The memory 26, may be integral with the location determining component 20, integral with the computing device 22, stand-alone memory, or a combination of both. The memory may include, for example, removable and non-removable memory elements such as RAM, ROM, flash, magnetic, optical, USB memory devices, and/or other conventional memory elements.

The memory 26 may store various data associated with the operation of the guidance system 10, such as the computer program and code segments mentioned above, or other data for instructing the computing device 22 and system elements to perform the steps described herein. Further, the memory 26 may store various cartographic data corresponding to geographic positions including map data and map elements, such as thoroughfares, terrain, alert positions, points of interest, geographic entities, radio stations, and other navigation data to facilitate the various navigation functions provided by the vehicle guidance system 10. Additionally, the memory 26 may store destination addresses and previously calculated or otherwise acquire routes to various destination addresses for later retrieval by the computing device 22. The various data stored within the memory 26 may also be associated within one or more databases to facilitate retrieval of the information.

The user interface 28 permits a user to operate the vehicle guidance system 10 and enables users, third parties, or other devices to share information with the guidance system 10. The user interface 28 may comprise one or more functionable inputs such as buttons, switches, scroll wheels, a touch screen associated with the display 24, voice recognition elements such as a microphone, pointing devices such as mice, touchpads, tracking balls, styluses, a camera such as a digital or film still or video camera, combinations thereof, etc. Further, the user interface 28 may comprise wired or wireless data transfer elements such as a removable memory including the memory 26, data transceivers, etc., to enable the user and other devices or parties to remotely interface with the guidance system 10. The device may also include a speaker for providing audible instructions and feedback.

The user interface 28 may be operable to provide various information to the user utilizing the display 24 or other visual or audio elements such as a speaker. Thus, the user interface 28 enables the user and guidance system 10 to exchange information relating to the guidance system 10, including geographic entities, configuration information security information, preferences, route information, points of interests, alerts and alert notification, navigation information, waypoints, a destination address, etc.

The power source 30 provides electrical power to various guidance system 10 elements. For example, the power source 30 may be directly or indirectly coupled with the location-determining component 20, the computing device 22, the display 24, the memory 26, and the user interface 28. The power source 30 may comprise conventional power supply elements such as batteries, battery packs, etc. The power source 30 may also comprise power conduits, connectors, and receptacles operable to receive batteries, battery connectors, or power cables.

The I/O ports 32 permit data and other information to be transferred to and from the computing device 22 and the location-determining component 20. The I/O ports 32 may include a TransFlash card slot for receiving removable TransFlash cards and a USB port for coupling with a USB cable connected to another computing device such as a personal computer. Navigational software, cartographic maps, and other data and information may be loaded in the guidance system 10 via the I/O ports 32.

The angle measurement device may sense the angle of the steerable wheel 16 directly through an angle-sensing transducer or may include a camera for visual inspection of the actual angle of the wheel 16 by the computing device 22. However, any means of measuring or sensing angles, as known in the art, may be used.

The components illustrated in FIG. 3 and described herein need not be physically connected to one another since wireless communication among the various depicted components is permissible and intended to fall within the scope of the present invention.

Figure 5:
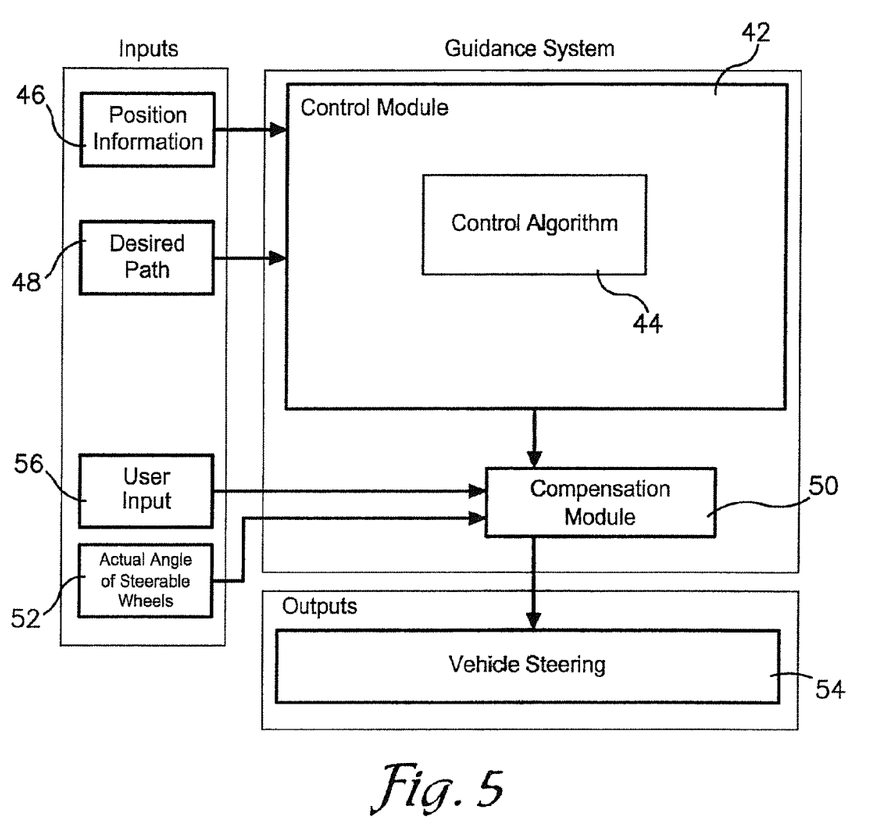
FIG. 5 is a block diagram of the vehicle guidance system of FIG. 1 and its inputs and outputs.

In various embodiments of the invention, as illustrated in FIG. 5, the computing device 22 may be comprise a control module 42 programmed with control algorithms 44 and operable to receive real-time position information 46 and desired path parameters 48 from any external or internal source. The control module 42 may process this data in order to produce a plurality of output commands, such as desired wheel speed and desired wheel angle for given points in time. The computing device 22 may also comprise a compensation module 50 which may receive the desired wheel angle from the control module 42 and actual angle measurements 52 from the angle measurement device 34 to determine the user-configurable steering parameter required for optimal steering performance. The compensation module 50 may also output a steering signal 54 to a wheel actuator (not shown) for physically turning the wheel 16. The steering signal 54 may be calculated based on control commands output by the control module 42 and the user-configurable steering parameter calculated by the compensation module 50. The compensation module 50 may additionally receive user input 56 from the user interface 28 when the system is placed in a "manual" mode. Additionally, the compensation module 50 may receive user input 56 to define an acceptable amount of deviation between the actual angle of the wheel 16 and the desired angle of the wheel 16.

In operation, the vehicle guidance system 10 may automatically adjust the user-configurable steering parameter of the vehicle 12. For example, the user-configurable steering parameter may be adjusted to increase or decrease the force at which the steerable wheel 16 is turned either right or left, thereby affecting the steering response, sensitivity, or the reaction time for the wheel 16 to reach the desired angle as commanded by the vehicle guidance system 10.

Figure 6:
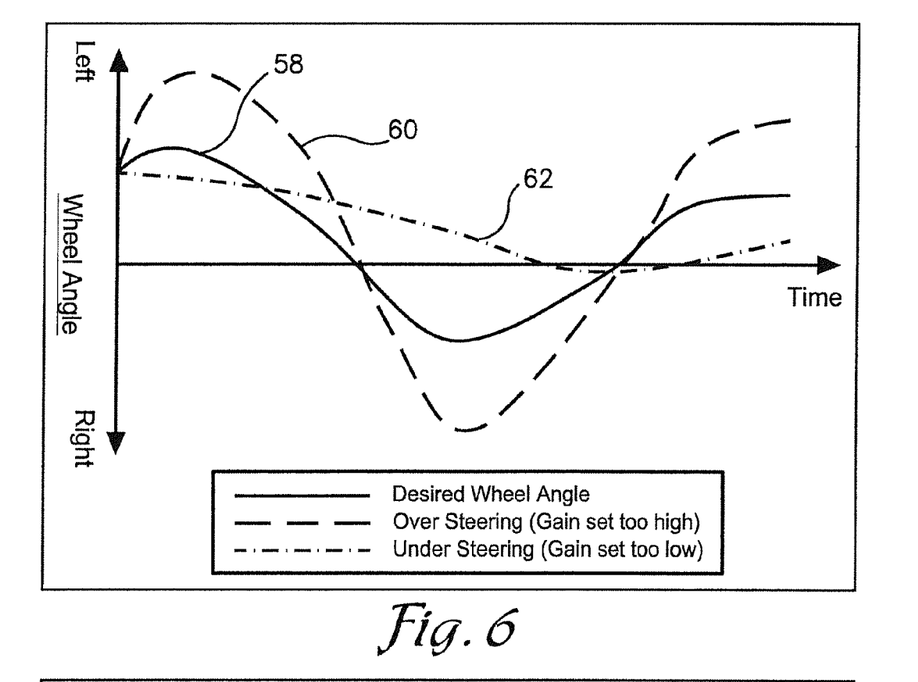
FIG. 6 is a graph of two example sets of data of the actual angles of steerable wheels compared with the desired angles of the steerable wheels over a period of time.

For example, as illustrated in FIG. 6, the vehicle guidance system 10 may define a desired wheel angle 58 for a plurality of points in time based on the dersired steering path 48, thereby determining how far left and how far right the wheel 16 should turn at given points in time in order to precisely follow this desired path 48. It should be understood that the vehicle 12 may travel in a straight line when the wheel 16 is aligned with the center axis 18. The center axis 18 therefore represents a zero-degree turn of the wheel 16. The actual angles of the wheel 16 may be measured in respect to the center axis 18.

FIG. 6 graphs a first set of actual angles 60 and a second set of actual angles 62 to demonstrate under-steering and over-steering. The first set of actual angles 60 demonstrates over-steering, meaning the user-configurable steering parameter, referred to as gain in this example, is set too high. Notice that, at most points in time, the over-steered actual angle 60 exceeds the desired angle 58 in the same direction from the center axis 18 as the desired angle 58. The second set of actual angles 62 demonstrates under-steering, meaning the user-configurable steering parameter, or steering gain in this example, is set too low. Notice that, at most points in time, the under-steered actual angle 62 is either less than the desired angle 58 or in the opposite direction from the center axis 18 as the desired angle 58.

Figure 7:
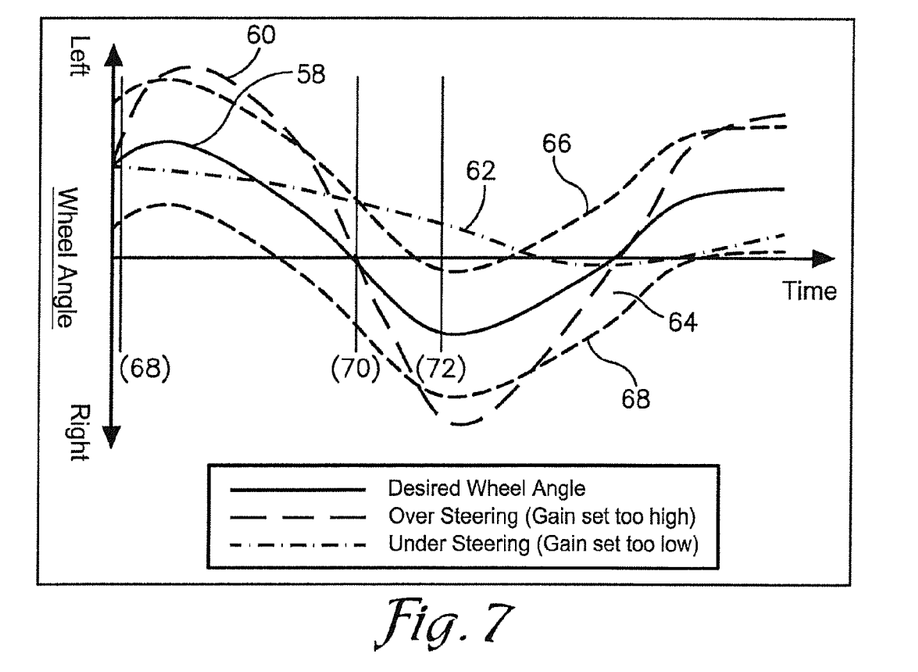
FIG. 7 is a graph comparing actual angles to desired angles of the steerable wheels over a period of time as in FIG. 6, further including a range of acceptable deviation of the actual angle from the desired angle for each point in time.

A small amount of deviation of the vehicle 12 from the desired path 48 may be acceptable in various situations. Therefore, as illustrated in FIG. 7, an acceptable range of deviation 64 may be defined either by a user or by the computing device 22. Note that, in FIG. 7, the user-configurable steering parameter is also denoted as steering "gain" for purposes of this example. The acceptable range of deviation 64 has a left limit 66 and a right limit 68 and is used to limit how far left of the desired angle 58 and how far right of the desired angle 58 the actual angle 60,62 may be at any given point in time. For example, FIG. 7 also graphs two sets of actual wheel angles 60,62 over a period of time compared with the desired angles 58 over the same period of time. At a first point in time 68, both of the actual angles 60,62 are within the acceptable range of deviation 64. At a second point in time 70, both of the actual angles 60,62 are still within the acceptable range of deviation 64, even though the steering performance of both, as graphed thus far, is poor. However, at a third point in time 72, both of the actual angles 60,62 should be right of the center axis 18, but both actual angles 60,62 are outside of the acceptable range of deviation 64. At the third point in time 72, the actual angle 60 is too far to the right, indicating that the vehicle 12 suffers from over-steering. Meanwhile, the actual angle 62 is to the left of the center axis 18, indicating that the vehicle 12 suffers from under-steering. Therefore, in various embodiments of the invention, the compensation module 50 determines if the actual angle 60,62 is outside of the acceptable range of deviation 64 and then determines if the deviation demonstrates an occurrence of over-steering or under-steering.

Figure 8:
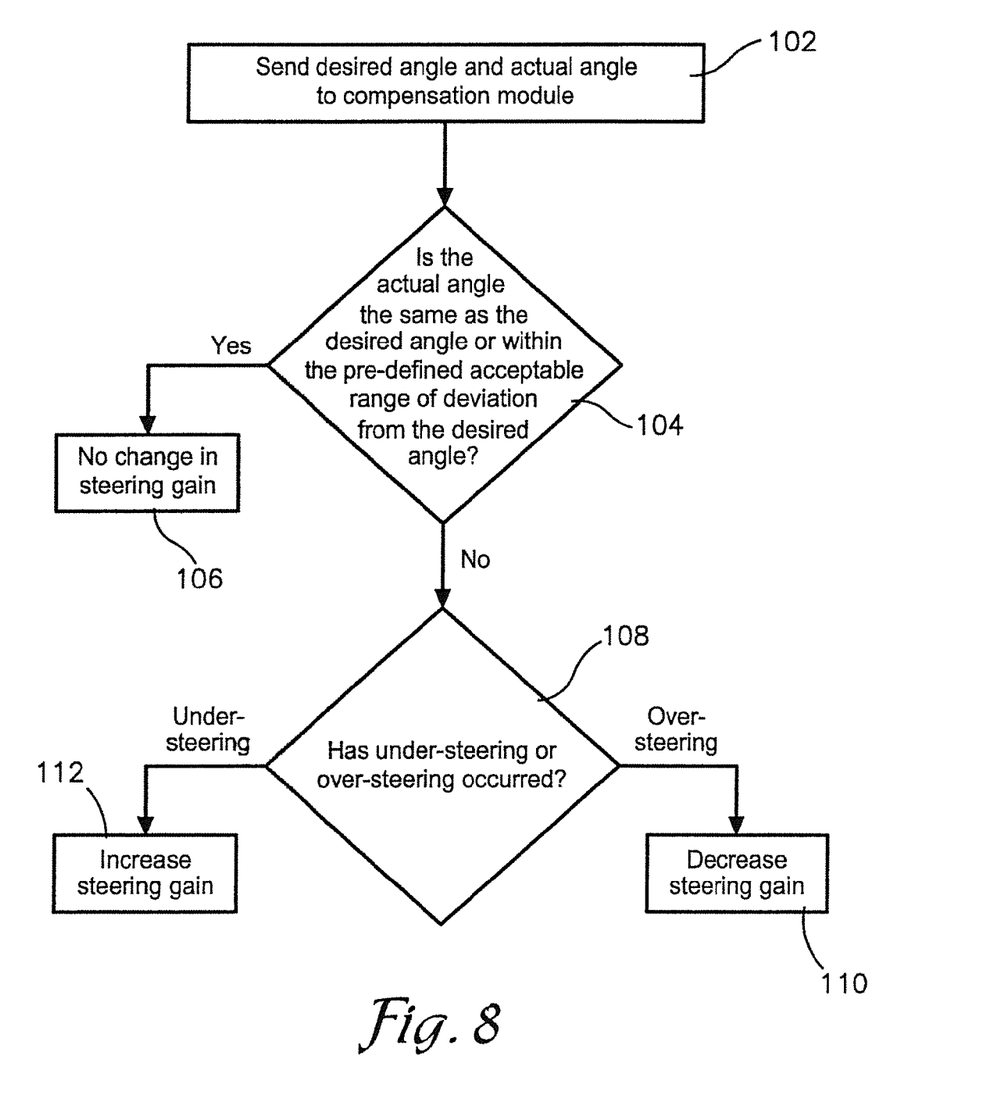
FIG. 8 is a flow chart illustrating method steps that may be performed by the vehicle guidance system of FIG. 1.

Specifically, as illustrated in FIG. 8, the compensation module 50 may perform the following steps. First the desired angle and the actual angle may be received by the compensation module 50, as in step 102. Then the compensation module 50 may compare the actual angle of the wheel 16 to the desired angle of the wheel 16, as in step 104. If the actual angle is the same as the desired angle or is within the pre-defined acceptable range of deviation 64 from the desired angle, then the user-configurable steering parameter, denoted as steering gain in this example, is not adjusted, as shown in step 106. However, if the actual angle is not within the acceptable range of deviation 64, then the compensation module 50 may determine if under-steering or over-steering has occurred, as shown in step 108. If over-steering has occurred, such that the actual angle is greater than the desired angle and in the same direction from the center axis 18 as the desired angle, then the user-configurable steering parameter or steering gain may be decreased, as shown in step 110. If under-steering has occurred, such that the actual angle is less than the desired angle or is in the opposite direction from the center axis 18 of the desired angle, then the user-configurable steering parameter or steering gain may be increased, as shown in step 112.

In a preferred embodiment of the invention, the compensation module may record the actual angle of the steerable wheel 16 for a plurality of points of time over a pre-determined period of time into memory 20. The compensation module 50 may also record how many incidents of under-steering and over-steering outside of the acceptable range of deviation 64 occur in the pre-determined period of time. If a pre-determined threshold of incidents is reached or exceeded within the pre-determined period of time, then the compensation module 50 may automatically adjust the user-configurable steering parameter accordingly. If the threshold of incidents is reached or exceeded within the pre-determined period of time, the compensation module 50 may calculate the required user-configurable steering parameter using the average amount of deviation of the actual angle from the desired angle for each recorded incident over the pre-determined period of time. Specifically, the incidents may be organized by whether over-steering or under-steering occurred, and then the frequency of over-steering occurrences may be compared with the frequency of under-steering occurrences to determine if the user-configurable steering parameter needs to be increased or decreased.

For example, if under-steering incidents are recorded four times as frequently as over-steering during the pre-determined period of time, then the compensation module 50 may calculate the average deviation of the actual angle from the desired angle for each occurrence of under-steering incidents during the pre-determined period of time. This average of deviations for under-steering incidents may then be used to determine by what amount the user-configurable steering parameter should be increased to compensate for the under-steering. Additionally, the threshold of incidents allowed within a period of time may be specific to over-steering or under-steering, as opposed to an overall incident count of both under-steering and over-steering occurrences. So, for example, if the number of recorded over-steering occurrences exceeds the threshold of incidents, the user-configurable steering parameter may be adjusted.

One example of the methods described above is illustrated in FIG. 9, in which the user-configurable steering parameter is denoted as steering gain. First the compensation module 50 may retrieve the desired angle and the actual angle for a current point in time, as in step 202. Next, the compensation module 50 may determine if the actual angle is the same as the desired angle or within the pre-defined acceptable range of deviation 64 from the desired angle, as in step 204. If the actual angle is within the pre-defined acceptable range of deviation 64, then step 202 may be repeated, with the compensation module 50 retrieving the next actual angle and desired angle for the next point in time. Otherwise, the compensation module 50 may determine if under-steering or over steering has occurred, as in step 206.

Figure 9:
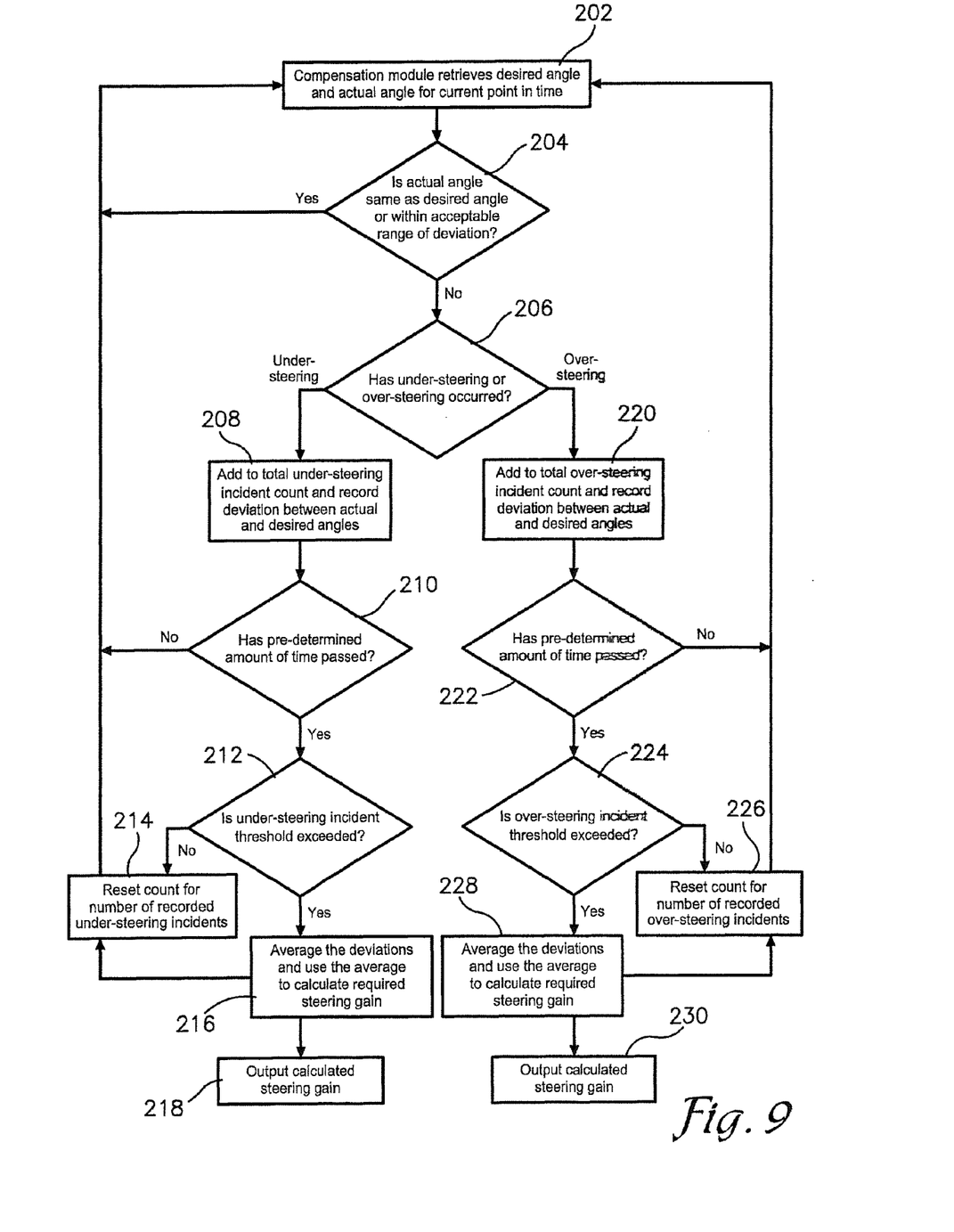
FIG. 9 is a flow chart illustrating method steps that may be performed by the vehicle guidance system of FIG. 1.

If under-steering has occurred, then the incident may be added to an under-steering incident count total and the difference between the actual angle and the desired angle may be recorded in memory 20, as in step 208. Then the compensation module 50 may determine if a pre-determined amount of time has passed, as in step 210. If the pre-determined amount of time has not passed, the compensation module 50 may return to step 202, obtaining the next angle values. If the pre-determined amount of time has passed, then the compensation module 50 may determine if the number of under-steering incidents exceeded the incident threshold during the pre-determined period of time, as in step 212. If the threshold was not exceeded, then the compensation module 50 may reset the under-steering incident count, as in step 214 and then repeat step 202, obtaining the next angle values. If the threshold was exceeded, the compensation module 50 may average the amounts of deviation between the actual angle and the desired angle for the under-steering incidents within the pre-determined period of time and use this average to calculate the required user-configurable steering parameter or steering gain, as in step 216. After step 216, the compensation module 50 may output the calculated user-configurable steering parameter or steering gain, as in step 218, reset the under-steering incident count, as in step 214, and then return to step 202, obtaining the next angle values.

If over-steering has occurred, then the incident may be added to an over-steering incident count total and the difference between the actual angle and the desired angle may be recorded in memory, as in step 220. Then the compensation module 50 may determine if a pre-determined amount of time has passed, as in step 222. If the pre-determined amount of time has not passed, the compensation module 50 may return to step 202, obtaining the next angle values. If the pre-determined amount of time has passed, then the compensation module 50 may determine if the number of over-steering incidents exceeded the incident threshold during the pre-determined period of time, as in step 224. If the threshold was not exceeded, then the compensation module 50 may reset the under-steering incident count, as in step 226 and then repeat step 202, obtaining the next angle values. If the threshold was exceeded, the compensation module 50 may average the amount of deviation between the actual angle and the desired angle for the over-steering incidents within the pre-determined period of time and use this average to calculate the required user-configurable steering parameter or steering gain, as in step 228. After step 228, the compensation module 50 may output the calculated user-configurable steering parameter or steering gain, as in step 230, reset the under-steering incident count, as in step 226, and then return to step 202, obtaining the next angle values.

Although the invention has been described with reference to the embodiments illustrated in the attached drawings, it is noted that equivalents may be employed and substitutions made herein without departing from the scope of the invention as recited in the claims. For example, the methods disclosed herein and illustrated in FIGS. 8-9 may be performed in any order and steps may be added or deleted without departing from the scope of the invention as recited in the claims. Also, the user-configurable steering parameter may include parameters such as steering gain, steering sensitivity, steering force, etc. Additionally, the user-configurable steering parameter need not be configured by a user, but may rather be configured or adjusted by the guidance system, as described above. Finally, the steerable wheel 16 may alternatively be a belt and track arrangement operable to advance and steer the vehicle such as used on a tank or various farm implements.

Having thus described an embodiment of the invention, what is claimed as new and desired to be protected by Letters Patent includes the following:

1. A vehicle guidance system for automatically tuning a user-configurable steering parameter applied to at least one steerable wheel of a vehicle, the system comprising:
    at least one memory storage component;
    an angle measurement device for measuring the actual angle of the at least one steerable wheel of the vehicle for a plurality of points in time;
    a computing device communicably coupled with the memory storage component and angle measurement device, wherein the computing device includes:
    a control module having control algorithms for processing position information and desired path parameters and outputting a desired angle for each of a plurality of points in time;
    a compensation module for receiving the desired angle and comparing the desired angle for each of the plurality of points in time with the actual angle of the steerable wheel for each of the plurality of points in time, determining if over-steering or under-steering has occurred, and outputting the user-configurable steering parameter based on the frequency at which over-steering or under-steering occurred over a pre-determined period of time, as recorded and stored in the memory storage component.

* * * * *